United States Patent
Chen

[11] Patent Number: 5,964,474
[45] Date of Patent: Oct. 12, 1999

[54] HEADSET ASSEMBLY FOR A BICYCLE

[76] Inventor: Chia-Chin Chen, 307, Chieh-Shou Villiage, Changhua City, Taiwan, Taiwan

[21] Appl. No.: 09/001,415

[22] Filed: Dec. 30, 1997

[51] Int. Cl.⁶ ................................................ B62K 21/18
[52] U.S. Cl. ..................... 280/279; 403/371; 74/551.1
[58] Field of Search ...................... 280/279, 280; 403/370, 371; 74/551.1; 384/538

[56] References Cited

U.S. PATENT DOCUMENTS

| 5,246,296 | 9/1993 | Chi | 384/540 |
|---|---|---|---|
| 5,331,864 | 7/1994 | Chi | 74/551.1 |
| 5,496,126 | 3/1996 | Lin | 403/370 |
| 5,647,684 | 7/1997 | Chen . | |
| 5,678,836 | 10/1997 | Chen | 280/280 |
| 5,680,798 | 10/1997 | Luen | 74/551.1 |
| 5,737,974 | 4/1998 | Chen | 74/551.1 |
| 5,823,556 | 10/1998 | Chi | 280/279 |
| 5,865,069 | 2/1999 | Edwards | 74/551.1 |

*Primary Examiner*—Lanna Mai
*Assistant Examiner*—Andrew J. Fischer
*Attorney, Agent, or Firm*—Bacon & Thomas

[57] ABSTRACT

The present invention relates to an improved headset for bicycle in which the head tube and the front fork tube are provided with a retaining ring and an inner and outer tapered bearing socket and tapered bearing respectively. The inner and outer tapered bearing socket and tapered bearing are firstly assembled to make the assembling work more easy and quickly. The headset assembly features a simplified and durable configuration which can be readily and quickly assembled.

1 Claim, 2 Drawing Sheets

HEADSET ASSEMBLY FOR A BICYCLE

FIELD OF THE INVENTION

The present invention relates to a headset assembly, more particularly, to an improved headset assembly for bicycle.

DESCRIPTION OF PRIOR ART

U.S. Pat. No. 5,536,104, issued on Jul. 16, 1996 to the same applicant has disclosed a bicycle head shaft bowl set in which a semi-cylindrical member and an upper cover are applied. Besides, a lashing ring is used to provide a self-centering effect. By this arrangement, the bearing can be suitably assembled at the best horizontal angle such that the bearing may smoothly rotated and the mating clearance can be also eliminated. An easy and quick assembling can be therefore attained.

However, the head shaft bowl set suggested in '104 can be still concluded with the following defects even the two-step fastening device and the circular lashing ring may attain its intended purpose. However, there are a plurality of configuring elements which makes the assembling work become more and more complicated and laborious.

SUMMARY OF THE INVENTION

It is the objective of this invention to provide an improved headset assembly in which the head tube and the front fork tube are provided with a retaining ring and an inner and outer tapered bearing socket and tapered bearing respectively. The inner and outer tapered bearing socket and tapered bearing are firstly assembled to make the assembling work more easy and quickly.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
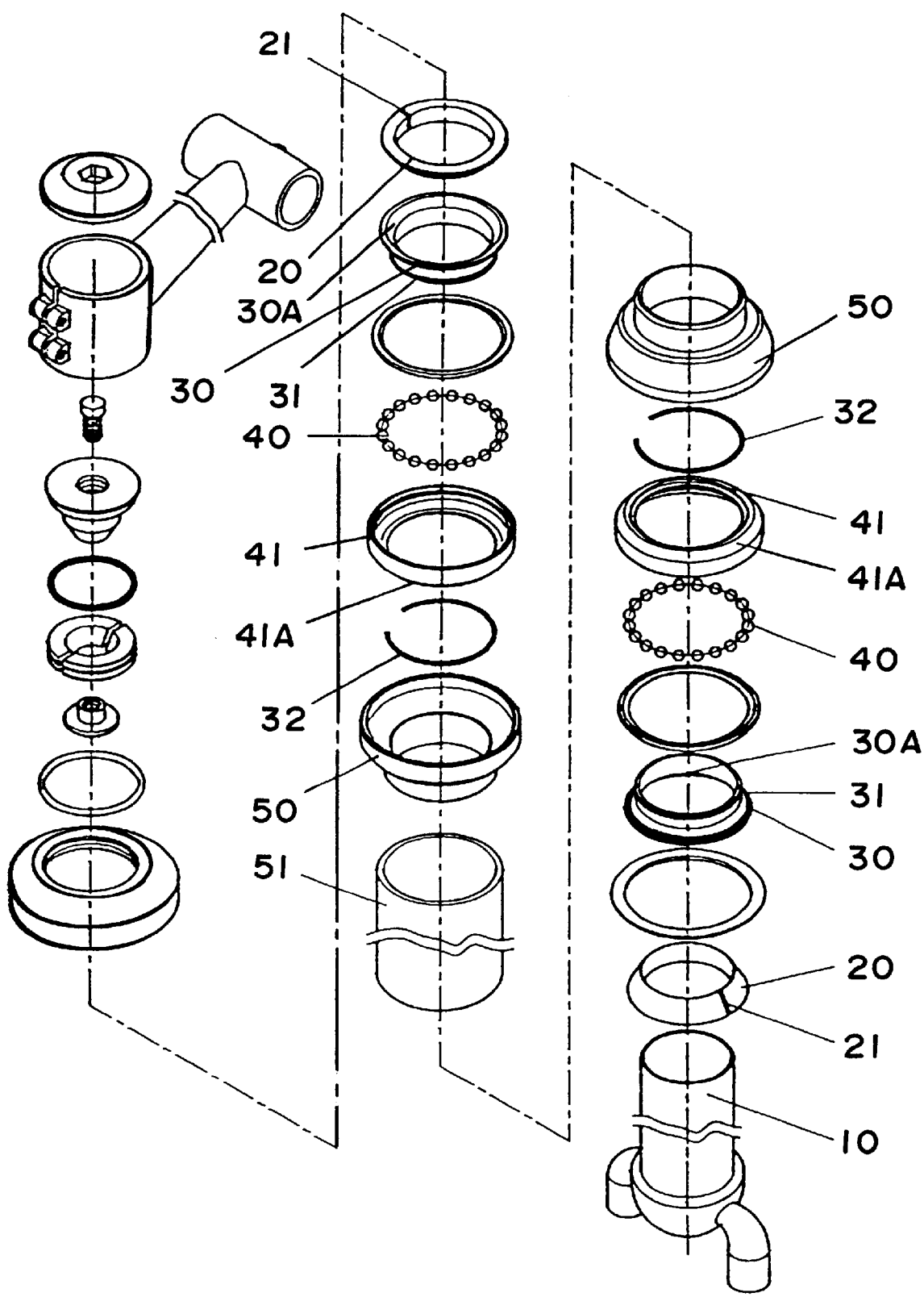
FIG. 1 is an exploded perspective view of the headset assembly made according to the present invention.
Figure 2:
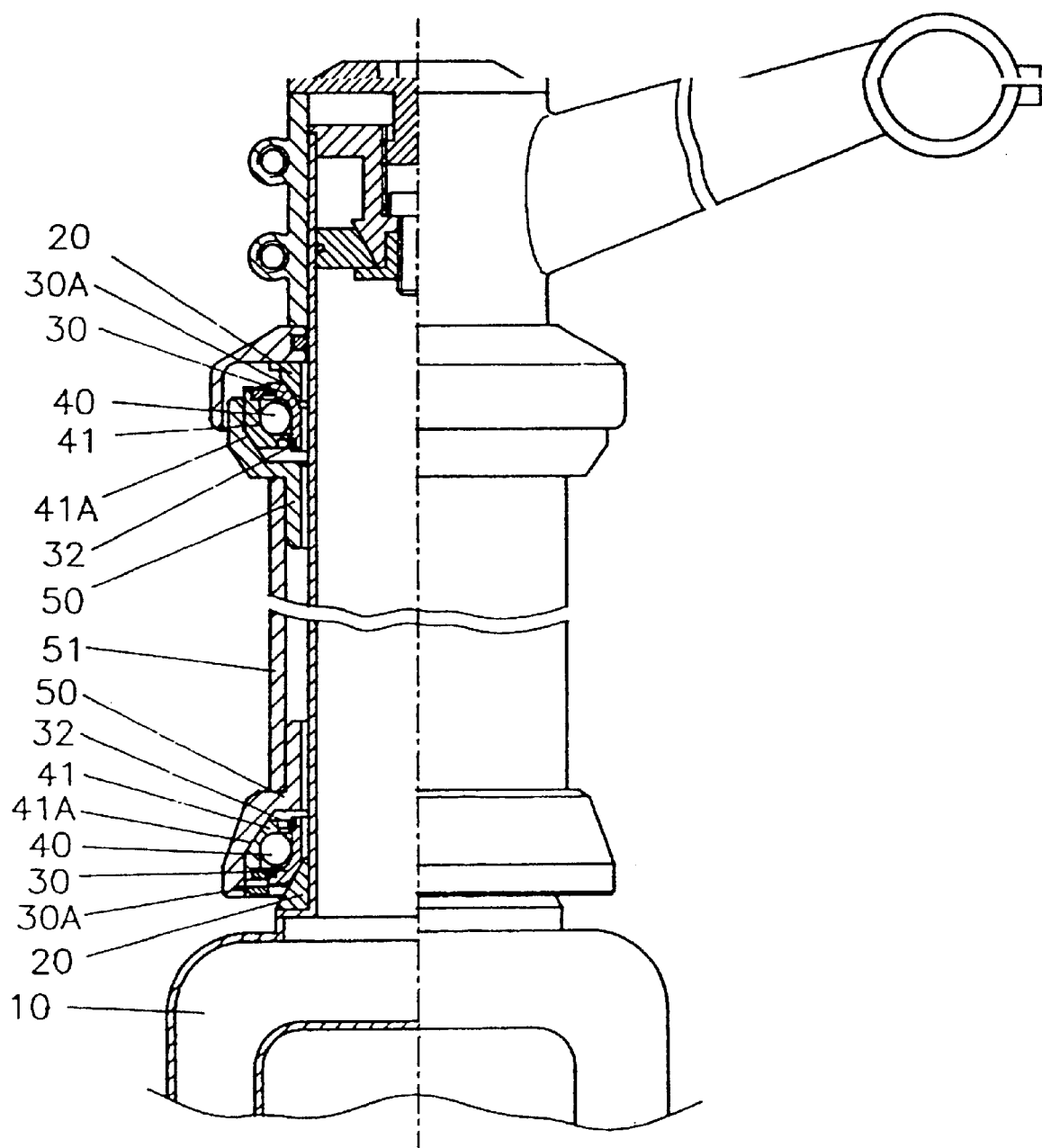
FIG. 2 is a partial, cross sectional view of the headset assembly shown in FIG. 1.

Referring to FIGS. 1 and 2, the front fork tube 10 is provided with a tapered bevel ring 20 at the lower end. The tapered bevel ring 20 is further provided with a cutout 21. The tapered bevel ring 20 is provided with an inner tapered bearing socket 30 and a retaining groove 31. The tapered surface 30A of the tapered bearing socket 30 is about 35° to 40° such that a tight engagement between the bearing socket 30 and the tapered bevel ring 20 is attained. A bearing 40 is disposed onto the bearing socket 30. The bearing 40 is further enveloped with an external tapered bearing socket 41 and the tapered surface 41A of the bearing socket 41 is between 35° to 40°. A retaining ring 32 is disposed within the retaining groove 31 and a bushing 50 is enveloped onto the external tapered bearing socket 41. As a result, a tight engagement between the bushing 50 and the tapered surface 41A of the bearing socket 41 can be attained.

The bushing 50 and the front fork tube 10 are simultaneously inserted into the head tube 51. The top of the head tube 51 is further disposed with another bushing 50 and the bearing 40. As a result, the assembling of the headset can be readily performed.

The present invention features the inner tapered bearing socket 30 is firstly enveloped with a bearing 40. Then the retaining ring 32 is fixedly attached to the retaining groove 31 and the top of the other external tapered bearing socket 41 and a complete set of bearing is attained. It can be readily appreciated that the assembling can be quickly and easily done.

On the other hand, the engagement between the inner tapered bearing socket 30 and the bearing 40 is attained by the retaining ring 32, the service life can be prolonged. Besides, the bearing 40 can be prevented from separating.

On the other hand, the tapered surface 30A of the inner tapered bearing socket 30 and the tapered surface 41A of the external tapered bearing socket 41 are both ranges from 35° to 40°. As a result, this tapered surfaces have a best mating with the tapered bevel ring 20 and the bushing 50. As a result, after the components are assembled, a tight engagement can be attained.

From the forgoing description, the headset assembly provides an easy and durable configuration which is superior than the bowl set suggested by '104 patent. The lower portion of the head tube 51 is directly provided with an external tapered bearing socket 41 and a bearing 40. Then the inner tapered bearing socket 30 and the retaining ring 32 are applied to form a bearing which can be quickly and easily formed.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

I claim:

1. An improved headset assembly, comprising a front fork tube which is provided with a tapered bevel ring at the lower end, said tapered bevel ring being further provided with a cutout, said tapered bevel ring being provided with an inner tapered bearing socket and a retaining groove, wherein the inclination of said tapered surface of said tapered bearing socket is about 35° to 40° such that a tight engagement between said inner tapered bearing socket and said tapered bevel ring is attained, a bearing being disposed onto said bearing socket, said bearing being enveloped with an external tapered bearing socket and wherein the inclination of said tapered surface of said external tapered bearing socket is between 35° to 40°, a retaining ring being disposed within said retaining groove and a bushing being enveloped onto said external tapered bearing socket to establish a tight engagement between said bushing and said tapered surface of said bearing socket, wherein said bushing and said front fork tube are simultaneously inserted into said head tube and the top of said head tube is further disposed with another bushing and bearing, wherein by the assembling of said bearing and said inner and outer tapered bearing sockets with a retaining ring, a headset assembly can be readily configured.

* * * * *